US012565566B2

(12) United States Patent
Park et al.

(10) Patent No.: US 12,565,566 B2
(45) Date of Patent: Mar. 3, 2026

(54) ROOM-TEMPERATURE-CURABLE ORGANOPOLYSILOXANE COMPOSITION AND PRODUCTION METHOD FOR SAME

(71) Applicants: SHIN-ETSU SILICONE KOREA Co., Ltd., Seoul (KR); Shin-Etsu Chemical Co., Ltd., Tokyo (JP)

(72) Inventors: Jaryong Park, Eumseong-gun (KR); Dongseop Yoon, Eumseong-gun (KR); Isao Iwasaki, Annaka (JP)

(73) Assignees: SHIN-ETSU SILICONE KOREA CO., LTD., Seoul (KR); SHIN-ETSU CHEMICAL CO., LTD., Tokyo (JP)

( * ) Notice: Subject to any disclaimer, the term of this patent is extended or adjusted under 35 U.S.C. 154(b) by 920 days.

(21) Appl. No.: 17/601,453

(22) PCT Filed: Apr. 1, 2020

(86) PCT No.: PCT/JP2020/015035
§ 371 (c)(1),
(2) Date: Oct. 5, 2021

(87) PCT Pub. No.: WO2020/213402
PCT Pub. Date: Oct. 22, 2020

(65) Prior Publication Data

US 2022/0169798 A1 Jun. 2, 2022

(30) Foreign Application Priority Data

Apr. 17, 2019 (JP) ................................ 2019-078627

(51) Int. Cl.
*C08G 77/16* (2006.01)
*C08K 3/26* (2006.01)
*C09K 3/10* (2006.01)

(52) U.S. Cl.
CPC ................ *C08G 77/16* (2013.01); *C08K 3/26* (2013.01); *C09K 3/1018* (2013.01); *C08K 2003/265* (2013.01); *C09K 2200/0239* (2013.01); *C09K 2200/0685* (2013.01)

(58) Field of Classification Search
CPC .... C08G 77/16; C08K 3/26; C08K 2003/265; C08K 2201/005; C08K 2201/014; C08K 5/544; C08K 5/5465; C08K 3/013; C08K 3/16; C08K 3/36; C09K 3/1018; C09K 2200/0239; C09K 2200/0685; C09K 3/10; C09J 183/04; C08L 83/06
See application file for complete search history.

(56) References Cited

U.S. PATENT DOCUMENTS 5,665,805 A 9/1997 Hatanaka et al.
9,879,126 B2 * 1/2018 Furukawa .............. H10N 30/50
10,570,234 B2 * 2/2020 Yamamoto ............ B32B 27/308
2003/0166739 A1 * 9/2003 Kimura .................. C08L 83/14
528/10
2007/0276085 A1 11/2007 Iwasaki et al.
2017/0306099 A1 * 10/2017 Yamaguchi ............ C08G 77/18

FOREIGN PATENT DOCUMENTS

CN 105238061 * 1/2016
JP 63-83167 A 4/1988
JP 9-151326 A 6/1997
JP 2004-182942 A 7/2004
JP 2004359752 A * 12/2004
JP 2007-314627 A 12/2007
JP 4912746 B2 4/2012
JP 2014-15557 A 1/2014
JP 2014015557 A * 1/2014
JP 2017165931 A * 9/2017 .............. B01J 23/42

OTHER PUBLICATIONS

Fujiki, JP2004359752-MT (Year: 2004).*
Isao, JP2014015557-MT (Year: 2014).*
International Search Report, issued in PCT/JP2020/015035, dated Jun. 23, 2020.
Written Opinion of the International Searching Authority, issued in PCT/JP2020/015035, dated Jun. 23, 2020.

* cited by examiner

*Primary Examiner* — Mark Eashoo
*Assistant Examiner* — Zhen Liu
(74) *Attorney, Agent, or Firm* — Birch, Stewart, Kolasch & Birch, LLP

(57) ABSTRACT

A room-temperature-curable organopolysiloxane composition that contains: 100 parts by mass of the product of reacting (A) a diorganopolysiloxane that is capped at both ends by a hydroxyl group, a hydroxy-group-containing hydrocarbon compound in such an amount as for there to be 0.01-0.5 mol per 1 mol of hydroxyl groups that are bonded to silicon atoms in the diorganopolysiloxane, and platinic chloride hexahydrate in an amount that is 0.01-1 mass % of the total of component (A); (B) 3-300 parts by mass of an inorganic filler; (C) 1-20 parts by mass of an organosilane that has at least 3 hydrolyzable groups per molecule thereof and/or a partial hydrolysis condensate of an organosilane that has at least 3 hydrolyzable groups per molecule thereof; (D) 0.01-5 parts by mass of a condensation cure catalyst; and (E) 0.1-5 parts by mass of a silane coupling agent (excluding component (C) and component (D)). The room-temperature-curable organopolysiloxane composition gives cured products that retain low-elastic-modulus rubber elasticity over long periods of time and do not readily contaminate natural rock, coated aluminum, or the like.

14 Claims, No Drawings

ROOM-TEMPERATURE-CURABLE ORGANOPOLYSILOXANE COMPOSITION AND PRODUCTION METHOD FOR SAME

TECHNICAL FIELD

This invention relates to an organopolysiloxane composition which crosslinks or cures at room temperature through condensation cure reaction with the aid of airborne moisture, into a silicone rubber elastomer, and more particularly, to a room temperature-curable organopolysiloxane composition which causes minimal contamination to the surrounding environment when applied to rock joints, glass, coated aluminum panels or the like, and which cures into a cured product having improved adhesion to various substrates, especially glass and coated aluminum substrates and experiencing only small changes of physical properties over a long term.

BACKGROUND ART

Compositions which cure at room temperature (23° C.±15° C.) into silicone rubber (or elastomers) are known in the art and have been widely used in the industry. The known room temperature (RT)-curing mechanisms include a curing mechanism through hydrosilylation reaction, a curing mechanism under ultra violet (UV) irradiation, a curing mechanism through condensation reaction between hydroxy groups and silicon-bonded hydrolyzable groups, and the like. Among these, the organopolysiloxane composition which cures through condensation reaction is advantageously used in such applications as building sealants and construction sealants because it is able to cure at room temperature and develop adhesion to various substrates and unlikely to experience cure inhibition due to impurities as encountered in the case of hydrosilylation reaction.

In the case of building sealants, it is advantageous from the standpoint of follow-up to sealing joints that the cured rubber exhibits low elasticity properties corresponding to the category of low to medium modulus defined by the Japan Sealant Industry Association including a Durometer Type A hardness of 10 to 30 and an elongation at break of at least 500% according to JIS K 6249. In order to meet such requirements, various techniques including dilution with a silicone oil free of reactive groups and addition of various plasticizers are employed. While these techniques are regarded more or less effective for the low modulus of elasticity, problems arise during long-term use that the migration of a plasticizer to the joint surrounding area leaves deposition of stains and when applied to porous materials such as natural rock, the migration of a plasticizer into the rock interior causes bleeding stains. It is desired to overcome these problems.

Although it is difficult to completely eliminate such staining, stain removal can be achieved to some extent in the case of a composition which is devoid of a non-reactive silicone oil as the plasticizer. In this case, however, there is a problem that the cured rubber has a high modulus and is poor in adhesion to metals and various coatings. As a measure to produce a soft rubber from a plasticizer-free composition, an attempt is made to reduce the crosslink density after curing by using a difunctional crosslinking agent having a chain extending ability in combination with a polyfunctional crosslinking agent for thereby inducing crosslinking while extending the diorganopolysiloxane chain during the curing reaction. Typical such compositions include those compositions, called aminoxy type, using a siloxane having a N,N-dialkylaminoxy group as the crosslinking agent, and those compositions, called amide type, using a silane having a N-alkylacetamide group as the crosslinking agent. These compositions, however, have the problems that storage stability is poor, cure inhibition is incurred by the co-presence of a compound having active hydrogen such as an alcohol, and residual free oil components become a contamination source like the plasticizer.

It is proposed in Patent Document 1 (JP-A S63-83167) to produce a rubber having a low crosslink density and good storage stability and experiencing no cure inhibition, using a functional group which has been widely used in the art. This proposal uses a compound having chain lengthening ability, typically $RNHCH_2MeSi(OMe)_2$. However, it is extremely difficult to prepare this compound in an economically acceptable manner, and it is also difficult to establish a consistent balance of the compound with another crosslinking agent. Also proposed are methods using a diorganopolysiloxane having a hydroxy group at one end and a trialkylsiloxy group at the other end of the molecular chain (Patent Documents 2 and 3: to JP-A H09-151326 and JP-A 2004-182942). When the diorganopolysiloxane capped with a silanol group at one end and with a trialkylsiloxy group at the other end is produced by a conventional method, i.e., equilibration polymerization of a diorganocyclopolysiloxane in the presence of an alkali or acid catalyst, there is produced non-reactive diorganopolysiloxane as a by-product. Since removal of this by-product is impossible, the problem that bleeding contamination occurs during service of this composition, for example, joints of natural rock or the like are stained is left unsolved.

The amount of the non-reactive diorganopolysiloxane by-product can be reduced by a method of performing ring-opening polymerization of cyclic siloxane trimer using trimethylsiloxy lithium as an initiator, or a method of performing polymerization in the presence of a pentacoordinated silicon compound using trimethylhydroxysilane as an initiator. These methods, however, are economically disadvantageous since the monomers and the catalysts are expensive.

It is also proposed (in Patent Document 4: JP 4912746) to use a triorganosilanol such as diphenylmethylsilanol to retard curing reaction for thereby reducing the crosslinking density. However, it is difficult to maintain low modulus properties over a long term.

As described above, there has been available no room temperature-curable organopolysiloxane composition which cures into a soft silicone rubber cured product that causes minimal bleeding stains on the surface of natural rock or the like and has a low to medium modulus favorable for sealants and excellent adhesion, which has improved storage stability, and which maintains low modulus properties over a long term after curing.

PRIOR ART DOCUMENTS

Patent Documents

Patent Document 1: JP-A S63-83167

Patent Document 2: JP-A H09-151326

Patent Document 3: JP-A 2004-182942

Patent Document 4: JP 4912746

SUMMARY OF INVENTION

Technical Problem

An object of the invention, which has been made under the above mentioned circumstances, is to provide a room temperature-curable organopolysiloxane composition which cures into a soft silicone rubber cured product that maintains rubber elasticity like a low modulus of elasticity in the low to medium modulus region over a long term and causes minimal stains to natural rock, coated aluminum or the like.

Solution to Problem

Making extensive investigations to attain the above object, the inventors have found that a room temperature-curable organopolysiloxane composition is obtained by mixing a diorganopolysiloxane having the general formula (1), a hydroxy-containing hydrocarbon compound having the general formula (2), typically alcohol compound in a specific ratio relative to silicon-bonded hydroxy (or silanol) groups in the diorganopolysiloxane and chloroplatinic acid preferably at 0° C. to 50° C. for at least 5 minutes for reaction, to form a reaction product, and uniformly mixing the reaction product with an organosilane having at least 3 hydrolyzable groups per molecule and/or a partial hydrolytic condensate thereof, an inorganic filler, a condensation curing catalyst, and a silane coupling agent until uniform; the formation of a free oil by-product (that is, non-functional silicone oil such as linear and/or branched diorganopolysiloxane capped at molecular chain ends with triorganosiloxy groups, typically linear diorganopolysiloxane capped at both ends of the molecular chain with triorganosiloxy groups, or cyclic diorganopolysiloxane free of functional groups in the molecule) in the composition is suppressed; a silicone rubber cured product having a low modulus of elasticity corresponding to the low to medium modulus region is obtained from the composition; low elastic cured products (silicone rubber) having excellent adhesion to adherends, for example, various substrates such as aluminum members surface-treated with fluoro-resins or acrylic resins and causing no stains to the surrounding environment such as porous materials (e.g., natural rock) and coated aluminum panels are obtained; the resulting room temperature-curable organopolysiloxane composition has satisfactory storage stability during shelf storage and solves the outstanding problems. The invention is predicated on this finding.

The invention provides a room temperature-curable organopolysiloxane composition and a method of preparing the same, as defined below.

1.

A room temperature-curable organopolysiloxane composition comprising:

(A) 100 parts by weight of the reaction product of (i) a diorganopolysiloxane having the general formula (1):

[Chem. 1]

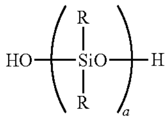

(1)

wherein R which is the same or different is an unsubstituted or substituted monovalent hydrocarbon group and a is an integer of at least 10, (ii) a hydroxy-containing hydrocarbon compound having the general formula (2):

$$R^1\text{—OH} \quad (2)$$

wherein $R^1$ which is the same or different is an unsubstituted or substituted monovalent hydrocarbon group of 3 to 20 carbon atoms, in an amount of 0.01 to 0.5 mole per mole of silicon-bonded hydroxy groups in the diorganopolysiloxane as component (i), and (iii) chloroplatinic acid hexahydrate in an amount of 0.01 to 1% by weight based on the entirety of component (A), (B) 3 to 300 parts by weight of an inorganic filler, (C) 1 to 20 parts by weight of an organosilane having at least 3 hydrolyzable groups per molecule and/or a partial hydrolytic condensate thereof, (D) 0.01 to 5 parts by weight of a condensation curing catalyst, and (E) 0.1 to 5 parts by weight of a silane coupling agent exclusive of components (C) and (D).

2.

The room temperature-curable organopolysiloxane composition of 1 wherein the content of a non-functional silicone oil is from 0% by weight to less than 10% by weight.

3.

The room temperature-curable organopolysiloxane composition of 1 or 2 wherein the inorganic filler as component (B) contains fumed silica and/or calcium carbonate.

4.

The room temperature-curable organopolysiloxane composition of any one of 1 to 3 wherein the silane coupling agent as component (E) is an amine base silane coupling agent having an alkoxysilyl group as a hydrolyzable group.

5.

The room temperature-curable organopolysiloxane composition of any one of 1 to 4 which cures into a silicone rubber cured product having a Durometer Type A hardness of 10 to 30 and an elongation at break of at least 500% according to JIS K 6249.

6.

The room temperature-curable organopolysiloxane composition of any one of 1 to 5 which cures into such a silicone rubber cured product that after the cured product is immersed in toluene for 24 hours, the amount of components extracted in the toluene layer is up to 10% by weight.

7.

The room temperature-curable organopolysiloxane composition of any one of 1 to 6 which is a building sealant.

8.

A method for preparing a room temperature-curable organopolysiloxane composition comprising the steps of:

mixing (i) a diorganopolysiloxane having the general formula (1):

[Chem. 2]

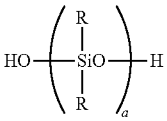

(1)

wherein R which is the same or different is an unsubstituted or substituted monovalent hydrocarbon group and a is an integer of at least 10, (ii) a hydroxy-containing hydrocarbon compound having the general formula (2):

$$R^1\text{—OH} \quad (2)$$

wherein $R^1$ which is the same or different is an unsubstituted or substituted monovalent hydrocarbon group of 3 to 20 carbon atoms, in an amount of 0.01 to 0.5 mole per mole of silicon-bonded hydroxy groups in the diorganopolysiloxane as component (i), and (iii) chloroplatinic acid hexahydrate in an amount of 0.01 to 1% by weight based on the total weight of components (i), (ii) and (iii), at 0° C. to 50° C. for at least 5 minutes, to form a reaction product (A), and uniformly mixing 100 parts by weight of the reaction product (A) with (B) 3 to 300 parts by weight of an inorganic filler, (C) 1 to 20 parts by weight of an organosilane having at least 3 hydrolyzable groups per molecule and/or a partial hydrolytic condensate thereof, (D) 0.01 to 5 parts by weight of a condensation curing catalyst, and (E) 0.1 to 5 parts by weight of a silane coupling agent exclusive of components (C) and (D).

The room temperature-curable organopolysiloxane composition of the invention should desirably meet that the content of a non-functional silicone oil (that is, linear and/or branched diorganopolysiloxane capped at molecular chain ends with triorganosiloxy groups (siloxy group whose silicon atom does not possess a Si—O—C linkage) and inert to condensation curing reaction, or cyclic diorganopolysiloxane free of functional groups in the molecule) be from 0% by weight to less than 10% by weight of the composition. If the content of non-functional silicone oil exceeds 10% by weight of the composition, a silicone rubber cured product obtained from curing of the composition may cause bleeding stains when used as a sealant to porous rock materials such as granite. It is noted that the content of non-functional silicone oil in the RT-curable organopolysiloxane composition of the invention can be determined by a weight loss test (or toluene extraction test) of immersing a cured product (silicone rubber) in toluene, drying and measuring a weight loss.

Further, the inorganic filler (B) is preferably any one selected from untreated calcium carbonate, calcium carbonate which has been treated with up to 3% by weight based on the calcium carbonate of a treating agent, and fumed silica, or a mixture thereof.

Advantageous Effects of Invention

The room temperature-curable organopolysiloxane composition of the invention cures into a cured product (silicone rubber) which has a low modulus of elasticity and causes minimal bleeding stains to porous rock materials such as granite. Since the cured product shows a satisfactory follow-up ability relative to joints experiencing noticeable expansion and shrinkage, it is advantageously used as a building sealant or the like.

DESCRIPTION OF EMBODIMENTS

Room Temperature-Curable Organopolysiloxane Composition

The room temperature (RT)-curable organopolysiloxane composition of the invention is described below.

Component (A)

The RT-curable organopolysiloxane composition of the invention contains component (A) which is a main component or base polymer in the composition. It is the reaction product of the following three components: (i) a diorganopolysiloxane, (ii) a hydroxy-containing hydrocarbon compound, and (iii) chloroplatinic acid hexahydrate, or obtained from substitution reaction of some silanol groups in component (i) with the hydroxy-containing hydrocarbon compound as component (ii).

Component (i)

Component (i) is a linear diorganopolysiloxane which is capped at both ends of the molecular chain with silanol groups, i.e., silicon-bonded hydroxy groups, specifically hydroxydiorganosiloxy groups, represented by the general formula (1).

[Chem. 3]

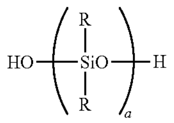

(1)

Herein R which is the same or different is an unsubstituted or substituted, preferably an unsubstituted or halogen-substituted, monovalent hydrocarbon group and "a" is an integer of at least 10.

In formula (1), R is independently selected from $C_1$-$C_6$ monovalent hydrocarbon groups including alkyl groups such as methyl, ethyl, propyl, isopropyl, hexyl, cycloalkyl groups such as cyclohexyl, alkenyl groups such as vinyl, allyl and propenyl, and aryl groups such as phenyl, and substituted monovalent hydrocarbon groups in which some or all of the hydrogen atoms are substituted by halogen atoms (e.g., F, Cl or Br), such as chloromethyl and 3,3,3-trifluoropropyl. Of these, methyl and phenyl are preferred, with methyl being most preferred. R may be the same or different.

The subscript "a" is an integer of at least 10, preferably 10 to 2,000, more preferably 50 to 1,200, even more preferably 100 to 1,000. Also, "a" is such a number that the diorganopolysiloxane may have a viscosity at 23° C. of preferably 100 to 1,000,000 mPa·s, more preferably 500 to 200,000 mPa·s. Notably, the viscosity is measured by a rotational viscometer (for example, BL, BH, BS or cone plate type or rheometer). In formula (1), the value of "a" representative of the repeat number of diorganosiloxane units (or degree of polymerization) is generally determined as a number average molecular weight (or number average degree of polymerization) versus polystyrene standards by gel permeation chromatography (GPC) using toluene as the developing solvent.

Component (ii)

Component (ii) is a hydrocarbon compound containing one hydroxy group in the molecule, represented by the general formula (2), typically an alcohol compound. It functions as a modulus-reducing agent which previously undergoes substitution reaction with a part of the hydroxy groups (i.e., silanol groups at both ends of the molecular chain) in component (i) in the presence of (iii) chloroplatinic acid hexahydrate, to form a reaction product (A) in which some of the silanol-containing siloxy groups (hydroxydiorganosiloxy groups) are substituted by (organoxy)diorganosiloxy groups, prior to blending in the composition.

$$R^1—OH \quad (2)$$

Herein $R^1$ which is the same or different is an unsubstituted or substituted monovalent hydrocarbon group of 3 to 20 carbon atoms.

In formula (2), $R^1$ is an unsubstituted or substituted monovalent hydrocarbon group of preferably 3 to 20 carbon atoms, more preferably 6 to 10 carbon atoms. Examples include (cyclo)alkyl groups such as propyl, isopropyl, butyl, isobutyl, sec-butyl, tert-butyl, pentyl, hexyl, cyclohexyl, 2-ethylhexyl, and decyl, aryl groups such as phenyl and tolyl, aralkyl groups such as allyl, butenyl, benzyl and 2-phenylethyl, and substituted forms of the foregoing groups in which some or all of the carbon-bonded hydrogen atoms are substituted by halogen atoms (e.g., F, Cl or Br) or cyano groups, such as chloromethyl, 3,3,3-trifluoropropyl and cyanoethyl. Of these, $R^l$ is preferably isopropyl, butyl, 2-ethylhexyl, phenyl, or 3,3,3-trifluoropropyl. Alkyl groups are more preferred from the standpoint of ease of preparation, with isopropyl, butyl and 2-ethylhexyl being most preferred.

Component (ii) is added in an amount of 0.01 to 0.50 mole, preferably 0.05 to 0.45 mole, more preferably 0.1 to 0.4 mole per mole of silicon-bonded hydroxy groups (or silanol groups) in the diorganopolysiloxane having formula (1) as component (i). If the amount is less than 0.01 mole per mole of silicon-bonded hydroxy groups (or silanol groups) in the diorganopolysiloxane as component (i), no sufficient modulus-reducing effect is exerted, failing to obtain a cured product having the desired soft rubber elasticity. If the amount exceeds 0.50 mole, detrimental effects are exerted on curability and adhesion, and the amount of the free oil component (so-called non-functional silicone oil such as linear and/or branched diorganopolysiloxane capped at molecular chain ends with triorganosiloxy groups as typified by a linear diorganopolysiloxane capped at molecular chain both ends with triorganosiloxy groups, or cyclic diorganopolysiloxane free of functional groups in the molecule) in the resulting cured product increases, with the risk of noticeable staining.

Component (iii)

Component (iii) is chloroplatinic acid hexahydrate. It is a component for promoting effective or quantitative substitution reaction of silanol groups in component (i) with the hydroxy-containing hydrocarbon compound as component (ii). The invention is characterized by this component. It is represented by the chemical formula: $H_2PtCl_6$-$6H_2O$, and a commercially available one may be used as such.

Component (iii) is added in an amount of 0.01 to 1% by weight based on the entirety of component (A), i.e., the total weight of components (i), (ii) and (iii). An amount of less than 0.01% by weight is insufficient to exert the effect of promoting reaction of component (i) with component (ii) whereas an amount in excess of 1% by weight is disadvantageous in view of cost.

Component (B)

The RT-curable organopolysiloxane composition contains an inorganic filler as component (B).

Examples of the inorganic filler as component (B) include calcium carbonate, fumed silica, aluminum oxide, aluminum hydroxide, talc, glass balloons, crystalline silica fine powder, amorphous silica fine powder, silica hydrogel, silica aerogel, diatomaceous earth, calcium silicate, aluminum silicate, titanium oxide, zinc oxide, ferrite, iron oxide, carbon black, graphite, mica, clay, bentonite, etc. Preferably, the filler contains fumed silica and/or calcium carbonate among others.

The calcium carbonate is arbitrarily selected from calcium carbonate which has been treated with a treating agent which is selected from fatty acids, resin acids, rosin acids, and/or alkali metal salts, alkaline earth metal salts, fatty acid esters, and quaternary ammonium salts thereof, and untreated calcium carbonate. Also, the fumed silica is arbitrarily selected from fumed silica which has been similarly treated with the above-mentioned treating agents, and untreated fumed silica. Examples of the resin acid used herein include abietic acid, dehydroabietic acid, dextropimaric acid, levopimaric acid, palustric acid, and sandaracopimaric acid. Carboxylic acids other than the resin acids are preferably those of at least 12 carbon atoms, though not limited thereto. For example, stearic acid, oleic acid, palmitic acid and lauric acid may be used. As the calcium carbonate to be treated with the above treating agents, colloidal calcium carbonate having an average primary particle size of up to 0.1 μm, especially 0.03 to 0.1 μm and/or ground (or heavy) calcium carbonate having an average primary particle size of more than 0.1 82 m may be used alone or in admixture. The amount of the treating agent with which calcium carbonate is treated is up to 3.0% by weight, especially 0.5 to 2.5% by weight based on the calcium carbonate. A treating amount in excess of 3.0% by weight may detract from the adhesion of the composition.

It is noted that the particle size of colloidal calcium carbonate is measured by electron microscopy, and the particle size of heavy calcium carbonate is computed from a specific surface area which is measured and calculated by the air permeability method.

The amount of the inorganic filler blended as component (B) is 3 to 300 parts by weight, preferably 8 to 200 parts by weight per 100 parts by weight of component (A). If the blending amount is less than 3 parts by weight, the desired reinforcement is not achieved. If the blending amount exceeds 300 parts by weight, kneading during preparation of the composition becomes difficult and the rubber as cured becomes hard, indicating that the composition having the desired rubber elasticity is difficultly available.

In the inventive composition, another filler may be additionally used if necessary. The amount of the other filler may be conventional as long as the benefits of the invention are not impaired.

Component (C)

The RT-curable organopolysiloxane composition contains as component (C) an organosilane having at least 3 hydrolyzable groups per molecule (exclusive of component (D)) and/or a partial hydrolytic condensate thereof (that is, an organosiloxane oligomer having at least 2, preferably at least 3 residual hydrolyzable groups in the molecule which is obtained from partial hydrolysis of the hydrolyzable organosilane). Component (C) functions as a storage stabilizing and crosslinking agent in the RT-curable organopolysiloxane composition.

Examples of the hydrolyzable group on the organosilane compound and its partial hydrolytic condensate as component (C) include ketoxime groups (e.g., dimethylketoxime, methylethylketoxime, methylisobutylketoxime), alkoxy groups (e.g., methoxy and ethoxy), acyloxy groups (e.g., acetoxy), and alkenyloxy groups (e.g., isopropenoxy). Examples of a silicon-bonded substituent group (monovalent hydrocarbon group) other than the hydrolyzable group in component (C) include unsubstituted monovalent hydrocarbon groups, for example, alkyl groups such as methyl, ethyl and propyl, aryl groups such as phenyl, and alkenyl groups such as vinyl and allyl. Component (C) is clearly distinguished from the condensation curing catalyst as component (D) and the silane coupling agent as component (E) to be described later in that component (C) does not contain in its molecule a monovalent hydrocarbon group substituted with a functional group containing a heteroatom such as nitrogen, oxygen or sulfur atom.

Illustrative examples of component (C) include ketoximesilanes such as tetrakis(methylethylketoxime)silane, methyltris(dimethylketoxime)silane, methyltris(methylethylketoxime)silane (also known as methyltris(2-butanoneoxime)silane), ethyltris(methylethylketoxime)silane, methyltris(methylisobutylketoxime)silane, and vinyltris (methylethylketoxime)silane (also known as vinyltris(2-butanoneoxime)silane); alkoxysilanes such as methyltrimethoxysilane, vinyltrimethoxysilane, phenyltrimethoxysilane, and vinyltriethoxysilane; acetoxysilanes such as methyltriacetoxysilane and vinyltriacetoxysilane; isopropenoxysilanes such as methyltriisopropenoxysilane, vinyltriisopropenoxysilane and phenyltriisopropenoxysilane; and partial hydrolytic condensates of the foregoing silanes. They may be used alone or in admixture.

The amount of component (C) blended is 1 to 20 parts by weight, preferably 5 to 15 parts by weight per 100 parts by weight of component (A). If the blending amount is less than 1 part by weight, crosslinking does not take place to a sufficient extent, often failing to obtain a cured product having the desired rubber elasticity. If the blending amount exceeds 20 parts by weight, the curing speed in the deep section which is out of contact with air is retarded, and the rubber as cured is hard and disadvantageous in cost.

Component (D)

The RT-curable organopolysiloxane composition contains as component (D) a condensation curing catalyst for promoting the cure of the composition.

The condensation curing catalyst as component (D) may be any of condensation curing catalysts commonly used in the art as a curing accelerator for compositions of the same category, and is not particularly limited. Exemplary catalysts include metal Lewis acids, for example, organotin compounds such as dibutyltin dimethoxide, dibutyltin diacetate, dibutyltin dioctate, dibutyltin dilaurate, dibutyltin bis(acetylacetonate), dibutyltin bis(benzylmalate), dimethyltin dimethoxide, dimethyltin diacetate, dioctyltin dioctate, dioctyltin dilaurate, tin dioctate, and tin dilaurate, and organotitanium compounds such as tetraisopropyl titanate, tetra-n-butyl titanate, tetra-tert-butyl titanate, tetra-n-propyl titanate, tetra-2-ethylhexyl titanate, diisopropyl di-tert-butyl titanate, dimethoxytitanium bisacetylacetonate, diisopropoxytitanium bisethylacetoacetate, di-tert-butoxytitanium bisethylacetoacetate, and di-tert-butoxytitanium bismethylacetoacetate; and amine compounds and salts thereof such as butylamine and octylamine, hydrolyzable silanes and siloxanes having a guanidyl group such as tetramethylguanidylpropyltrimethoxysilane, tetramethylguanidylpropylmethyldimethoxysilane, tetramethylguanidylpropyltris(trimethylsiloxy)silane, which may be used alone or in combination of two or more.

The amount of the condensation curing catalyst blended is up to 10 parts by weight, preferably 0.01 to 5 parts by weight per 100 parts by weight of component (A). An amount of the curing catalyst in excess of 10 parts by weight may invite cracking and breakage after the durability test. In a smaller amount, a long time is taken until cure, which is practically unfavorable.

Component (E)

The RT-curable organopolysiloxane composition contains as component (E) a silane coupling agent (exclusive of components (C) and (D), specifically so-called carbon-functional hydrolyzable silane or carbon-functional silane having a monovalent hydrocarbon group substituted with a functional group containing a heteroatom such as nitrogen, oxygen or sulfur (exclusive of guanidyl group) and a silicon-bonded hydrolyzable group in the molecule) for improving the adhesion of a cured product.

The silane coupling agent as component (E) is preferably selected from amine base silane coupling agents having an alkoxysilyl group as the hydrolyzable group, for example, N-(2-aminoethyl)-3-aminopropyltrimethoxysilane, 3-aminopropyltriethoxysilane, and 3-(N-aminomethylbenzylamino)propyltrimethoxysilane.

The amount of the silane coupling agent blended as component (E) is 0.1 to 5 parts by weight, preferably 0.2 to 5 parts by weight per 100 parts by weight of component (A). A blending amount of less than 0.1 part by weight fails to achieve sufficient adhesion whereas an amount in excess of 5 parts by weight is disadvantageous in cost.

Besides the foregoing components, various additives may be added to the RT-curable organopolysiloxane composition if necessary, for example, pigments, dyes, tackifiers, thixotropic agents, antiseptics, flame retardants, and mildewproofing agents. The amounts of these optional components added may be conventional amounts as long as the benefits of the invention are not impaired.

The RT-curable organopolysiloxane composition as defined above is stored in the absence of moisture. On use, the composition is exposed to air after unsealing or unpacking, whereby it cures at room temperature through reaction with airborne moisture, into a silicone rubber elastomer having a low to medium modulus. Preferably, the RT-curable organopolysiloxane composition cures into a silicone rubber cured product having a Durometer Type A hardness of 10 to 30 and an elongation at break of at least 500% according to JIS K 6249. Also preferably, the composition cures into such a silicone rubber cured product that after the cured product is immersed in toluene for 24 hours, the amount of components extracted in the toluene layer is up to 10% by weight. The composition is substantially unsusceptible to cure inhibition which is encountered in compositions of hydrosilylation reaction curing mechanism and compositions of aminoxy and amide types, causes few bleeding stains when applied to porous materials such as natural rock, and exhibits adhesion to various substrates, especially coated aluminum members. Therefore, the composition is useful as adhesives, coating agents, and especially building sealants.

Method of Preparing Room Temperature-Curable Organopolysiloxane Composition

The invention also provides a method for preparing the RT-curable organopolysiloxane composition, comprising the steps of:

mixing component (i) or diorganopolysiloxane having the general formula (1), component (ii) or hydroxy-containing hydrocarbon compound having the general formula (2) in an amount of 0.01 to 0.5 mole per mole of silicon-bonded hydroxy groups in the diorganopolysiloxane as component (i), and component (iii) or chloroplatinic acid hexahydrate in an amount of 0.01 to 1% by weight based on the total weight of components (i), (ii) and (iii), at 0° C. to 50° C. for at least 5 minutes, to form a reaction product (A), and uniformly mixing 100 parts by weight of the reaction product (A) with (B) 3 to 300 parts by weight of an inorganic filler, (C) 1 to 20 parts by weight of an organosilane having at least 3 hydrolyzable groups per molecule and/or a partial hydrolytic condensate thereof, (D) 0.01 to 5 parts by weight of a condensation curing catalyst, and (E) 0.1 to 5 parts by weight of a silane coupling agent exclusive of components (C) and (D).

In the practice of the invention, the reaction product (A) is obtained by mixing component (i) or diorganopolysiloxane having formula (1), component (ii) or hydroxy-containing hydrocarbon compound having formula (2), and component (iii) or chloroplatinic acid hexahydrate at 0° C. to 50° C. for at least 5 minutes, for thereby inducing substitution reaction of some silanol groups in component (i) with the hydroxy-containing hydrocarbon compound as component (ii).

In the step of forming the reaction product (A), the temperature at which components (i), (ii) and (iii) are mixed for reaction is from 0° C. to 50° C., preferably from 10° C. to 40° C. At a temperature below 0° C., the modulus-reducing effect is insufficient. A temperature in excess of 50° C. may cause more component (ii) to volatilize off, failing to obtain the desired physical properties.

As to the mixing/reaction time, at least 5 minutes, preferably at least 10 minutes is necessary in order to achieve the desired effect. Although no particular limit is imposed on the prolongation of the reaction time, mixing for a long time is disadvantageous in cost. Thus, when a time interval is taken until the subsequent step, it is preferred that mixing be completed within about 3 hours and the composition be sealed and stored before it is used.

The reaction product (A) thus obtained is mixed with the remaining components (B) to (E) in the standard way, preferably under reduced pressure, thereby obtaining the RT-curable organopolysiloxane composition.

EXAMPLES

Examples and Comparative Examples are given below for further illustrating the invention although the invention is not limited thereto. Notably, the viscosity is measured by a rotational viscometer.

Example 1

To 100 parts by weight of dimethylpolysiloxane capped at both ends of the molecular chain with hydroxy groups, having a viscosity of 50,000 mPa·s at 23° C. (of formula (1) wherein a=874, silicon-bonded hydroxy group content 0.00305 mole), 0.017 part by weight of chloroplatinic acid hexahydrate and 0.15 part by weight (0.38 mole per mole of silicon-bonded hydroxy groups (or silanol groups) in the hydroxy-capped dimethylpolysiloxane) of 2-ethylhexanol were added. The contents were mixed at 23° C. for 10 minutes until uniform, obtaining Reaction Product 1.

To 100 parts by weight of Reaction Product 1, 70 parts by weight of colloidal calcium carbonate (trade name: OKYUMWHA BK-04, by Dongho Calcium Co., Ltd., average primary particle size 0.04 μm), 8 parts by weight of methyltris(2-butanoneoxime)silane, 2 parts by weight of vinyltris(2-butanoneoxime)silane, 1 part by weight of N-(2-aminoethyl)-3-aminopropyltrimethoxysilane, and 0.05 part by weight of dioctyltin dilaurate were added. The contents were mixed under reduced pressure until uniform, yielding a RT-curable organopolysiloxane composition.

Comparative Example 1

A RT-curable organopolysiloxane composition was prepared as in Example 1 aside from adding 0.17 part by weight of platinum 1,3-divinyltetramethyldisiloxane complex instead of 0.017 part by weight of chloroplatinic acid hexahydrate.

Comparative Example 2

A RT-curable organopolysiloxane composition was prepared as in Example 1 except that Reaction Product 1 was not previously prepared and 100 parts by weight of dimethylpolysiloxane capped at both ends of the molecular chain with hydroxy groups, having a viscosity of 50,000 mPa·s at 23° C. was used instead of Reaction Product 1.

Comparative Example 3

A RT-curable organopolysiloxane composition was prepared as in Example 1 except that 2-ethylhexanol was not added.

Comparative Example 4

A RT-curable organopolysiloxane composition was prepared as in Example 1 except that Mixture 1 which was obtained without adding chloroplatinic acid hexahydrate, i.e., by mixing 100 parts by weight of dimethylpolysiloxane capped at both ends of the molecular chain with hydroxy groups, having a viscosity of 50,000 mPa·s at 23° C. (of formula (1) wherein a=874, silicon-bonded hydroxy group content 0.00305 mole), and 0.15 part by weight (0.38 mole per mole of silicon-bonded hydroxy groups (or silanol groups) in the hydroxy-capped dimethylpolysiloxane) of 2-ethylhexanol, was used instead of Reaction Product 1, and 0.017 part by weight of chloroplatinic acid hexahydrate was finally added.

Comparative Example 5

A RT-curable organopolysiloxane composition was prepared as in Example 1 except that the amount of 2-ethylhexanol was changed to 0.20 part by weight (0.51 mole per mole of silicon-bonded hydroxy groups (or silanol groups) in the hydroxy-capped dimethylpolysiloxane).

Evaluation Methods

The RT-curable organopolysiloxane compositions thus obtained were evaluated as follows.

(1) Physical properties (Durometer Type A hardness, tensile strength, elongation at break) of cured product Each of the compositions prepared in Example and Comparative Examples was cast into a mold of 2 mm and cured at 23° C. and 50% RH for 7 days into a rubber sheet of 2 mm thick. Physical properties (Durometer Type A hardness, tensile strength, elongation at break) of the rubber sheet (cured product of RT-curable organopolysiloxane composition) were measured by the "method of testing cured silicone rubber" (hardness test and tensile test) according to JIS K6249.

(2) ASTM C719 Class 50 cyclic movement fatigue durability test

To evaluate resistance to movement at the sealing joint, the test for durability in cyclic movement at ±50% according to the ASTM standards, C719 was carried out. Specifically the test was carried out as follows.

Sample Preparation

Measurement is made using a support substrate (material: float glass, dimensions: 1 inch wide, 3 inches long, ¼ inch thick) and n=3.

After a primer for support substrate was coated to a joint (width ½ inch), the RT-curable organopolysiloxane composition was applied and cured at 23° C. and 50% RH for 7 days.

The lapse of 1 week of 50% compression at 70° C. was followed by a cycle test.

(weight of cured product after toluene immersion)]/(weight of cured product before toluene immersion)×100

The sample is judged satisfactory when the toluene extraction amount is up to 10% by weight, because minimal bleeding contamination upon application to porous materials such as natural rock is expectable.

(4) Bleeding contamination

Bleeding contamination was evaluated as follows.

A joint of 50 mm long, 10 mm wide, 10 mm deep was defined between two pieces of white granite of 50 mm long, 50 mm wide, 10 mm thick. A contamination examining test sample was prepared by filling the joint with the RT-curable organopolysiloxane composition in the uncured state, finishing with a spatula the joint surface to be flat and smooth, and allowing to cure at 23° C. for 2 weeks. The test sample was subjected to outdoor weathering for 3 months, after which the surface of white granite was visually observed. The sample was rated Poor (x) when bleeding stains were found as wet patterns in a range of 1 mm or more from the joint, and Good (○) when bleeding stains were found in a range of less than 1 mm from the joint.

The foregoing test results are shown in Table 1.

TABLE 1

| | Example 1 | Comparative Example 1 | Comparative Example 2 | Comparative Example 3 | Comparative Example 4 | Comparative Example 5 |
|---|---|---|---|---|---|---|
| Durometer Type A hardness | 20 | 41 | 42 | 40 | 42 | 9 |
| Tensile strength (MPa) | 1.8 | 2.0 | 1.7 | 1.9 | 2.1 | 0.8 |
| Elongation at break (%) | 760 | 440 | 360 | 400 | 450 | 810 |
| Durability in cyclic movement (ASTM C719 Class 50) | ○ | x | x | x | x | ○ |
| Toluene extraction amount (wt %) | 7.7 | 3.1 | 2.6 | 2.6 | 2.7 | 13.8 |
| Bleeding contamination | ○ | ○ | ○ | ○ | ○ | x |

Cycle Test

The test was carried out 10 cycles, each cycle consisting of 50% expansion and 50% compression (joint movement speed: ⅛ inch/h).

Next, the thermal cycling test (50% compression at 70° C., followed by 50% expansion at −26° C.) was carried out 10 cycles.

After the test, the sample was observed and rated Pass (○) when the area of peel or cohesive failure is up to 50% of the entire sample (total area of n=3), and Reject (x) otherwise.

(3) Toluene extraction amount

As an index of the amount of free oil component in the composition, the content of a linear and/or branched diorganopolysiloxane capped at molecular chain end with triorganosiloxy group and a cyclic diorganopolysiloxane free of a functional group in the composition was determined by the following weight loss test (toluene extraction test). Specifically, the toluene extraction amount was determined by immersing 2 g of a cured product, which was obtained from curing at ambient temperature 23° C. and humidity 50% RH for 7 days, in 100 g of toluene for 24 hours, drying the cured product in an environment of ambient temperature 23° C. and humidity 50% RH for 24 hours, and computing the difference in the weight of the cured product before and after the immersion according to the following equation.

Toluene extraction amount (wt %) =[(weight of cured product before toluene immersion)−

As described above, the RT-curable organopolysiloxane composition within the scope of the invention cures into a silicone rubber cured product having a low hardness and elongation, and is applicable to joints experiencing substantial movement. Since the amount of free oil component as extracted with toluene is small, it is expectable that bleeding stains are minimized over a long term even when the composition is applied to joints of porous natural rock or the like.

The invention claimed is:

1. A room temperature-curable organopolysiloxane composition comprising:

(A) 100 parts by weight of the reaction product of (i) a diorganopolysiloxane having the general formula (1):

(1)

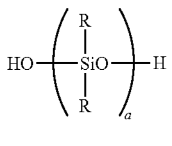

wherein R which is the same or different is an unsubstituted or substituted monovalent hydrocarbon group and a is an integer of at least 10, (ii) a hydroxy-containing hydrocarbon compound having the general formula (2):

$$R^1—OH \quad (2)$$

wherein $R^1$ which is the same or different is an unsubstituted or substituted monovalent hydrocarbon group of 3 to 20 carbon atoms, in an amount of 0.01 to 0.5 mole per mole of silicon-bonded hydroxy groups in the diorganopolysiloxane as component (i), and (iii) chloroplatinic acid hexahydrate in an amount of 0.01 to 1% by weight based on the entirety of component (A), (B) 3 to 300 parts by weight of an inorganic filler, (C) 1 to 20 parts by weight of an organosilane having at least 3 hydrolyzable groups per molecule and/or a partial hydrolytic condensate thereof, (D) 0.01 to 5 parts by weight of a condensation curing catalyst, and (E) 0.1 to 5 parts by weight of an amine base silane coupling agent having an alkoxysilyl group as a hydrolyzable group exclusive of components (C) and (D).

2. The room temperature-curable organopolysiloxane composition of claim 1 wherein the content of a non-functional silicone oil is from 0% by weight to less than 10% by weight.

3. The room temperature-curable organopolysiloxane composition of claim 1 wherein the inorganic filler as component (B) contains fumed silica and/or calcium carbonate.

4. The room temperature-curable organopolysiloxane composition of claim 1 which cures into a silicone rubber cured product having a Durometer Type A hardness of 10 to 30 and an elongation at break of at least 500% according to JIS K 6249.

5. The room temperature-curable organopolysiloxane composition of claim 1 which cures into such a silicone rubber cured product that after the cured product is immersed in toluene for 24 hours, the amount of components extracted in the toluene layer is up to 10% by weight.

6. The room temperature-curable organopolysiloxane composition of claim 1 which is a building sealant.

7. A method for preparing a room temperature-curable organopolysiloxane composition comprising the steps of:

mixing (i) a diorganopolysiloxane having the general formula (1):

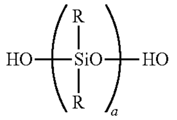

(1)

wherein R which is the same or different is an unsubstituted or substituted monovalent hydrocarbon group and a is an integer of at least 10, (ii) a hydroxy-containing hydrocarbon compound having the general formula (2):

$$R^1\text{—OH} \quad (2)$$

wherein $R^1$ which is the same or different is an unsubstituted or substituted monovalent hydrocarbon group of 3 to 20 carbon atoms, in an amount of 0.01 to 0.5 mole per mole of silicon-bonded hydroxy groups in the diorganopolysiloxane as component (i), and (iii) chloroplatinic acid hexahydrate in an amount of 0.01 to 1% by weight based on the total weight of components (i), (ii) and (iii), at 0° C. to 50° C. for at least 5 minutes, to form a reaction product (A), and uniformly mixing 100 parts by weight of the reaction product (A) with (B) 3 to 300 parts by weight of an inorganic filler, (C) 1 to 20 parts by weight of an organosilane having at least 3 hydrolyzable groups per molecule and/or a partial hydrolytic condensate thereof, (D) 0.01 to 5 parts by weight of a condensation curing catalyst, and (E) 0.1 to 5 parts by weight of an amine base silane coupling agent having an alkoxysilyl group as a hydrolyzable group exclusive of components (C) and (D).

8. The room temperature-curable organopolysiloxane composition of claim 1 wherein in the hydroxy-containing hydrocarbon compound having the general formula (2) as component (ii), $R^1$, which is the same or different, is an unsubstituted or substituted monovalent hydrocarbon group of 6 to 20 carbon atoms.

9. The room temperature-curable organopolysiloxane composition of claim 1 wherein the amount of component (E) is 0.2 to 5 parts by weight.

10. The method of claim 7 wherein the amount of component (E) is 0.2 to 5 parts by weight.

11. The room temperature-curable organopolysiloxane composition of claim 1 wherein component (A) is the reaction product obtained from only three components (1), (ii), and (iii).

12. The room temperature-curable organopolysiloxane composition of claim 1 wherein component (A) is the reaction product obtained from a substitution reaction of some silanol groups in component (i) with the hydroxy-containing hydrocarbon compound as component (ii).

13. The method of claim 7 wherein in the step of forming the reaction product (A), only three components (i), (ii), and (iii) are mixed.

14. The method of claim 7 wherein the reaction product (A) is formed by inducing a substitution reaction of some silanol groups in component (i) with the hydroxy-containing hydrocarbon compound as component (ii).

* * * * *